United States Patent [19]

Sugiura

[11] Patent Number: 5,757,980
[45] Date of Patent: May 26, 1998

[54] PATTERN IMAGE ADDING APPARATUS FOR ADDING A PATTERN TO AN END OF A DESIGNATED AREA

[75] Inventor: Takashi Sugiura, Kawasaki, Japan

[73] Assignee: Canon Kabushiki Kaisha, Japan

[21] Appl. No.: 361,189

[22] Filed: Dec. 21, 1994

[30] Foreign Application Priority Data

Dec. 24, 1993 [JP] Japan .................. 5-327259

[51] Int. Cl.[6] .................................................. G06K 9/00
[52] U.S. Cl. ........................ 382/284; 345/114; 395/135
[58] Field of Search .................................... 382/282, 284; 358/450, 453; 395/135; 345/113, 114

[56] References Cited

U.S. PATENT DOCUMENTS

| | | | |
|---|---|---|---|
| 5,058,189 | 10/1991 | Kanno | 382/61 |
| 5,142,273 | 8/1992 | Wobermin | 340/703 |
| 5,303,334 | 4/1994 | Snyder et al. | 395/109 |
| 5,465,160 | 11/1995 | Kamo et al. | 358/401 |

*Primary Examiner*—Andrew Johns
*Attorney, Agent, or Firm*—Fitzpatrick, Cella, Harper & Scinto

[57] ABSTRACT

An image processing apparatus includes an area designation unit for designating a desired area on an original, a mode setting unit for setting a mode for adding, to the image of the original, a gradation pattern of which pattern size varies periodically, a pattern generation unit for generating an image representing the gradation pattern, and a control unit for controlling the pattern generation means, when the mode is set by the mode setting means, in such a manner that a pattern of the largest or smallest size in the gradation pattern is added to at an end of the area designated by the area designation means.

25 Claims, 6 Drawing Sheets

GPAT

| FF | F0 | E0 | E0 | E0 | F0 | FF |
|----|----|----|----|----|----|----|
| F0 | D0 | C0 | C0 | C0 | D0 | F0 |
| E0 | C0 | 80 | 80 | 80 | C0 | E0 |
| E0 | C0 | 80 | 40 | 80 | C0 | E0 |
| E0 | C0 | 80 | 80 | 80 | C0 | E0 |
| F0 | D0 | C0 | C0 | C0 | D0 | F0 |
| FF | F0 | E0 | E0 | E0 | F0 | FF |

PATTERN IMAGE ADDING APPARATUS FOR ADDING A PATTERN TO AN END OF A DESIGNATED AREA

BACKGROUND OF THE INVENTION

1. Field of the Invention

The present invention relates to an image processing apparatus capable of adding a patterned image variable in size.

2. Related Background Art

In the field of such image processing apparatus there have been principally employed, for emphasizing characters or the like, methods of adding a shadow to the character, of increasing the thickness of the character, of adding a pattern on the character, and of adding a pattern outside the character, and there is also conceived a method of periodically varying the size of the pattern to be added.

Figure 9A:
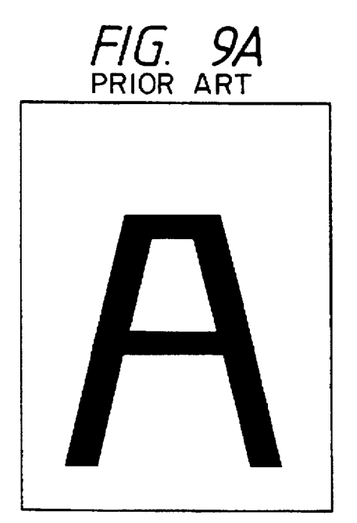
FIGS. 9A and 9B are views showing the gradation process in a conventional image processing apparatus.
Figure 9B:
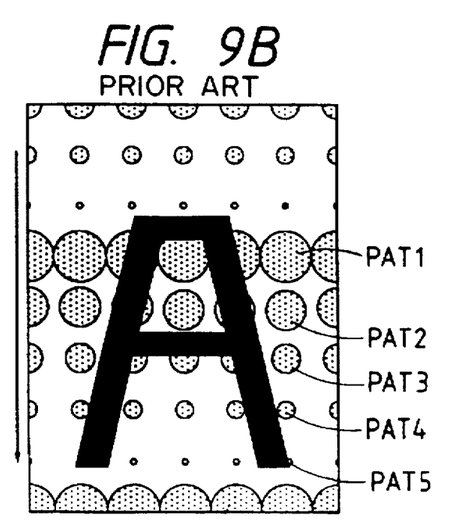

FIGS. 9A and 9B show the gradation processing in the conventional image processing apparatus, wherein FIG. 9A shows an original, consisting of a character "A", to be subjected to image processing, while FIG. 9B shows an example of gradation process in a direction indicated by an arrow, by repeated generation of patterns periodically variable in size, i.e. circular patterns PAT1–PAT5 in this case.

In the conventional example, as shown in FIG. 9B, there has not been provided means for designating the point of the maximum or minimum size in the periodically varying patterns PAT1–PAT5, so that the desired effect of image emphasis cannot be attained.

Particularly when an area is designated and the gradation pattern is added only in such a designated area, and if the smallest pattern PAT5 or the largest pattern PAT1 is always attached in a fixed position on the original, the pattern size at the beginning of the designated area varies depending on the position of such designated area, so that the expected effect of image emphasis often cannot be attained.

OBJECTS OF THE INVENTION

An object of the present invention is to provide a pattern image adding apparatus, not associated with the above-mentioned drawbacks.

Another object of the present invention is to provide a pattern image adding apparatus capable, in adding patterns that vary in size in regular manner to an original image, of controlling the pattern generation in such a manner that an array of patterns always starts with a largest-sized or smallest-sized pattern at a designated position or at the upper end of a designated area, thereby enabling image processing of enhanced visual effect with patterns varying in a regular manner with respect to an arbitrarily designated area or position.

Still other objects of the present invention, and the features thereof, will become fully apparent from the following description, to be taken in conjunction with the attached drawings, and from the appended claims.

DESCRIPTION OF THE PREFERRED EMBODIMENTS

Figure 1:
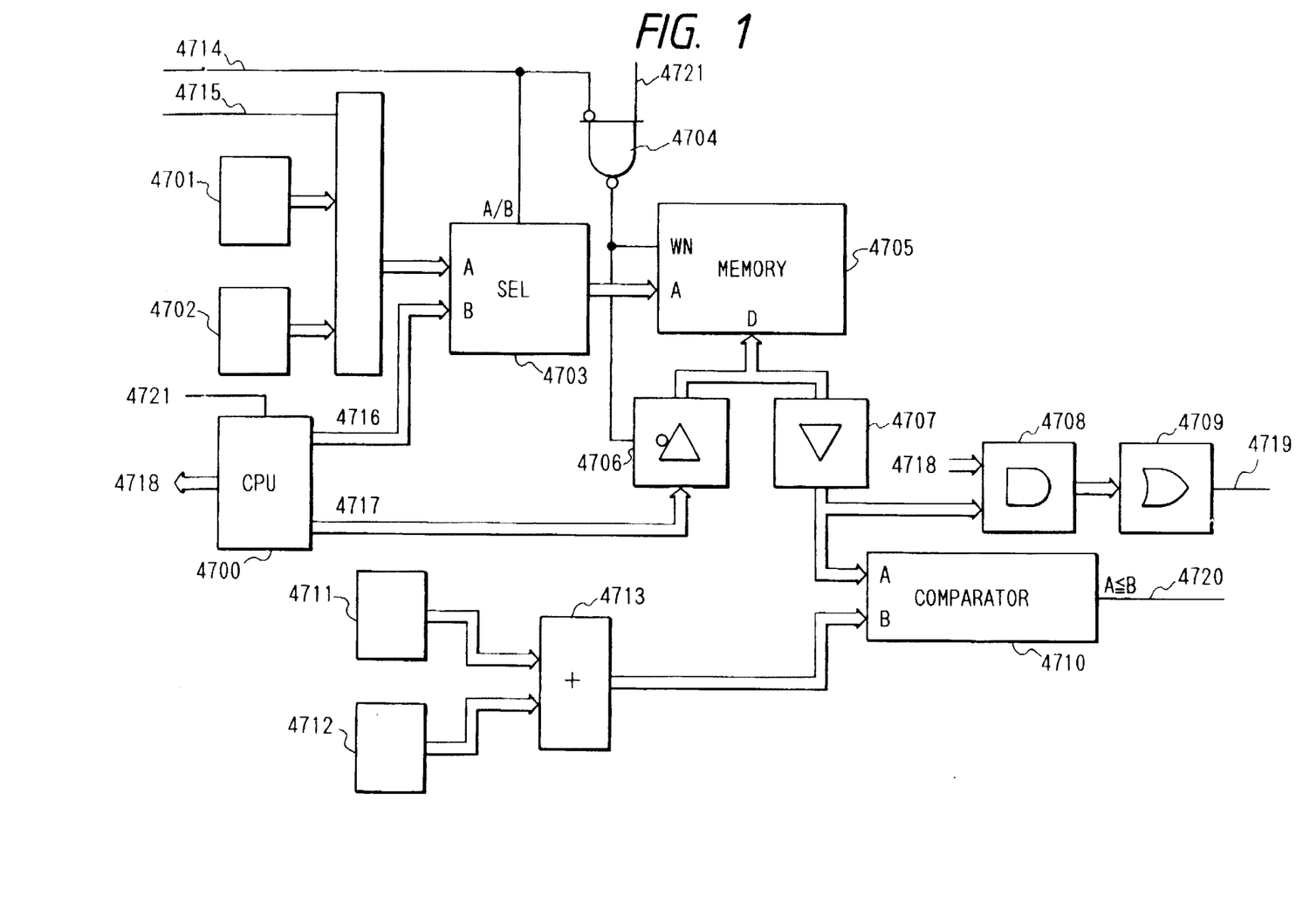
FIG. 1 is a block diagram of a pattern generation unit in the image processing apparatus embodying the present invention.

FIG. 1 is a block diagram of a pattern generation unit in an image processing apparatus embodying the present invention.

In FIG. 1 there are shown an address bus 4716 of a CPU 4700, a data bus 4717 thereof, and a selector 4703. When a memory control signal 4714 is "0", the data on the address bus 4716 of the CPU 4700 are entered into an address port of a re-writable memory 4705 (composed of a RAM in this case).

A write signal 4721 (LOW active) of the CPU 4700 is supplied to a gate 4704. Thus, if the CPU 4700 effects a writing operation to a RAM 4705 when the data of the address bus of the CPU 4700 are supplied to an address port of the RAM 4705, the write signal is supplied to the RAM 4705 and the data on the data bus 4717 of the CPU 4700 are entered into a buffer 4706. In this manner the CPU 4700 can rewrite the content of the RAM 4705, in response to a memory control signal 4714 in a state "0".

There are provided a main scanning up-counter 4701 and a sub scanning up-counter 4702, and an address for reading the pattern to be added is supplied to the RAM 4705 when a memory control signal 4714 is shifted to "1". The pattern read from the RAM 4705 is supplied, through a buffer 4707, to an AND gate 4708.

In this embodiment, the RAM 4705 has a byte structure designed so as to provide 8 different patterns at the same time, for each bit on the data bus, and one of the eight patterns is selected by a 3-bit pattern selection signal 4718 from the CPU 4700 and is supplied to an OR gate 4709.

The OR gate 4709 is used for converting an 8-bit signal into 1-bit signals. There are further shown a pattern signal 4719 released from the OR gate 4709; a main scanning up-counter 4711; a sub scanning up-counter 4712; an adder 4713; and a comparator 4710 for releasing a gradation signal 4720 assuming a value "1" only when A≦B.

Figure 2:
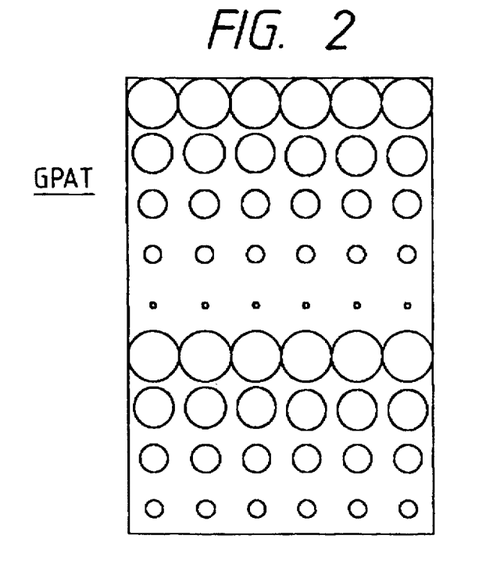
FIG. 2 is a view showing an example of the gradation pattern used in the image processing apparatus of the present invention.

FIG. 2 shows an example of the gradation pattern in the image processing apparatus of the present invention.

As shown in FIG. 2, the gradation pattern of this embodiment varies in size with a predetermined repeating interval.

Figure 3:
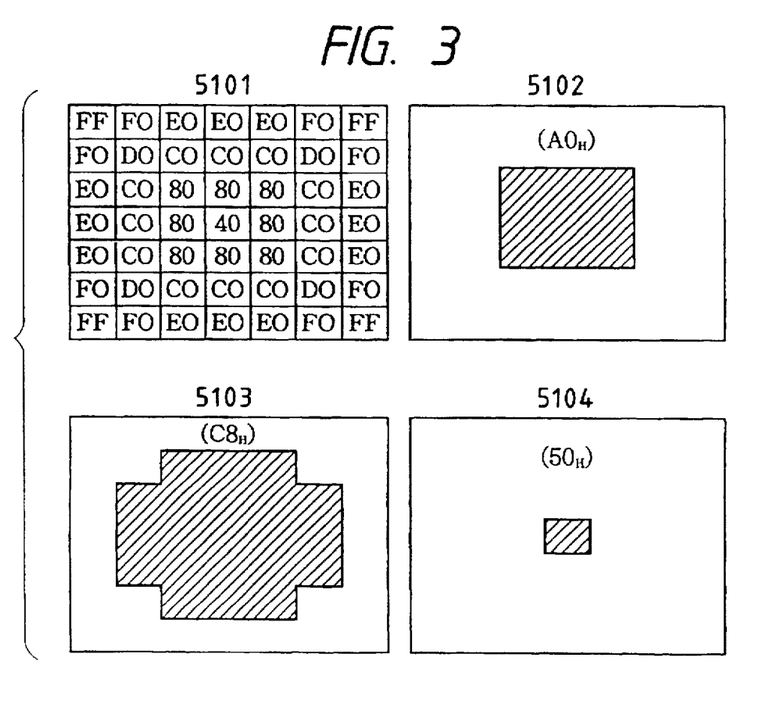
FIG. 3 is a view showing the principle of generation of the gradation pattern in the image processing apparatus shown in FIG. 1.

In the following there will be briefly explained the principle of generation of the gradation pattern, with reference to FIG. 3 showing the principle of generation in the image processing apparatus shown in FIG. 1.

In FIG. 3, 5101 indicates the gradation generating threshold levels, represented for example as a 7×7 matrix and stored in advance in the RAM 4705. In practice the RAM 4705 also stores the ordinary pattern explained above, so that such pattern and the gradation generating threshold values are stored in respective halves of the RAM 4705.

These data are switched by a switching signal 4715. A gradation is generated by threshold levels 5101 represented by a 7×7 matrix, in which each number indicates the threshold level.

When data, for example "A0H", are entered into the matrix (more specifically entered to the terminal B of the comparator 4710), a dot pattern 5102 is released therefrom.

Also a dot pattern 5103 or 5104 is released from the comparator 4710, respectively in response to data "C8H" or "50H". In this manner the dot size increases with an increase in the value of the entered image signal.

Since the input image signal is obtained from the adder 4713 shown in FIG. 1, the repeating period and the direction of the gradation can be varied in various manners, by appropriate changes in the output of the adder.

For example, a gradation pattern varying in size in the main scanning direction can be produced by the function of the main scanning up-counter 4711 only, and a gradation pattern varying in size in the sub scanning direction can be produced by the function of the sub scanning up-counter 4712 only. Also a gradation pattern varying in the diagonal direction can be obtained by the simultaneous function of the two up-counters.

Also the size varying period may be altered by a change in the counting speed of the counter 4711 and/or the counter 4712, and a gradation pattern starting from the largest dot size or one starting from the smallest dot size can be respectively achieved by a down-counting operation from a large value or an up-counting operation from a small value.

It is also possible to vary the shape and the size of the dots constituting the gradation pattern, as the threshold values stored in the RAM 4705 are re-writable.

Figure 4:
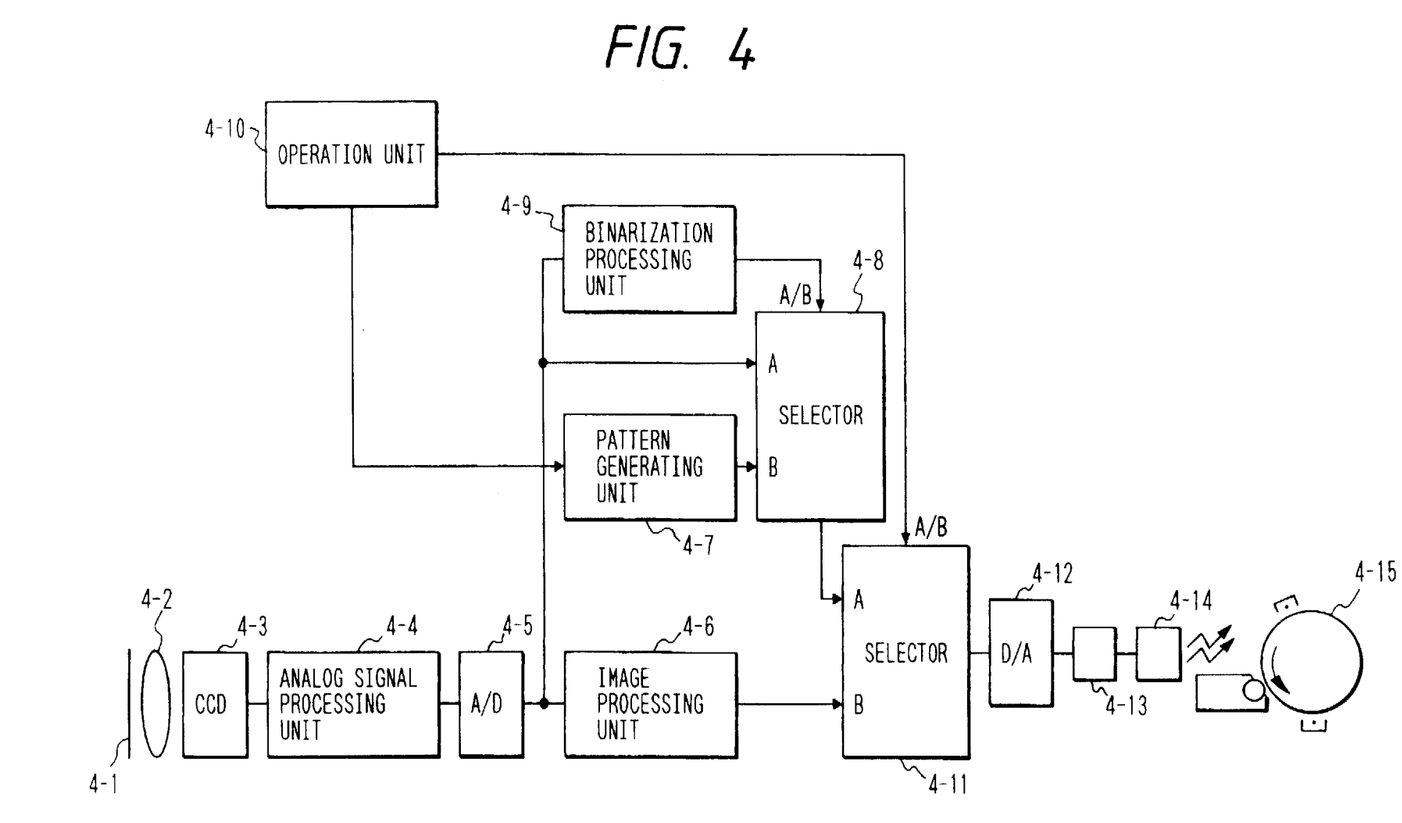
FIG. 4 is a block diagram showing an embodiment of the image processing apparatus of the present invention.

FIG. 4 is a block diagram showing the configuration of an embodiment of the image processing apparatus of the present invention.

An original 4-1 is illuminated by an unrepresented light source, and the light reflected from the original is projected, through a lens 4-2, onto a CCD 403. The analog signal obtained in the CCD 4-3 is subjected to gain control etc. in an analog signal process unit 4-4, and is converted into multivalue digital information by an A/D conversion unit 4-5. An image process unit 4-6 effects conversion of the luminance information of the original, read by the CCD 4-3, into density information matching the printing characteristics of a printer (a laser beam printer in the present embodiment), together with other processes such as image magnification change, image movement etc.

A pattern generation unit 4-7 is same as that shown in FIG. 1 and generates a gradation pattern for example as shown in FIG. 2. A binarization process unit 4-9 employs, in the present embodiment, a simple binarizing method with a fixed threshold value. A 2-input 1-output selector 4-8 selects the pattern information (B) or the multi-value digital information (A) respectively when a selection signal, consisting of the binarized signal from the binarization process unit 4-9, is "0" or "1".

Stated differently, the pattern information is so selected as to add the pattern only in the non-image area. A similar 2-input 1-output selector 4-11 selects the gradation pattern (input A) only in an area designated by the operation unit 4-10. The selector 4-11 selects the input A in the designated area, and the input B outside the designated area. The pattern generation unit 4-7 receives a start signal for the gradation pattern from a CPU (4700 in FIG. 1) in the operation unit 4-10, and in response resets and starts the counters 4711, 4712 shown in FIG. 1, whereby the gradation pattern is generated starting from the largest or smallest size.

It is therefore rendered possible, in an arbitrary area, to set the smallest or largest size of the pattern at the end of the area, by the combination of the start timing signal from the CPU 4700 and the area signal indicating the area for gradation process.

The image information released from the selector 4-11 is converted by a D/A converter 4-12 into an analog signal, then pulse width modulated by a pulse width modulation unit 4-13 and is supplied to a laser 4-14 for forming a latent image on a drum 4-15, the latent image being subsequently developed into a visible image.

Figure 5:
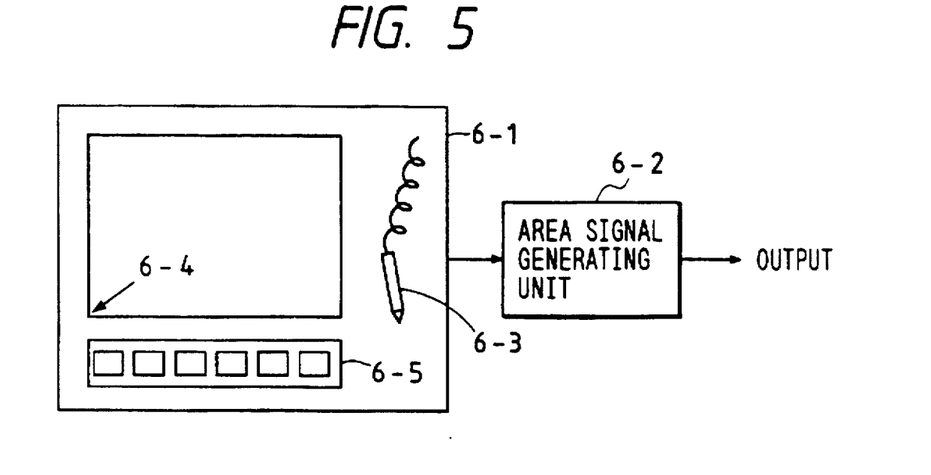
FIG. 5 is a view showing the structure of an operation unit shown in FIG. 4.

FIG. 5 shows the configuration of the operation unit 4-10 shown in FIG. 4.

An area is designated by a pen 6-3 on a digitizer 6-1, by placing the original at a reference frame 6-4 on the digitizer 6-1 and pointing the corners of a desired area on the original, by means of the 6-3.

Then the gradation process is selected by the operation switches 6-5, then the original is placed on an original supporting table and the start of a copying operation is instructed by the switches 6-5, whereby area signal generation means 6-2 generates the area signal and the pattern start signal in the course of the copying sequence.

Figure 6:
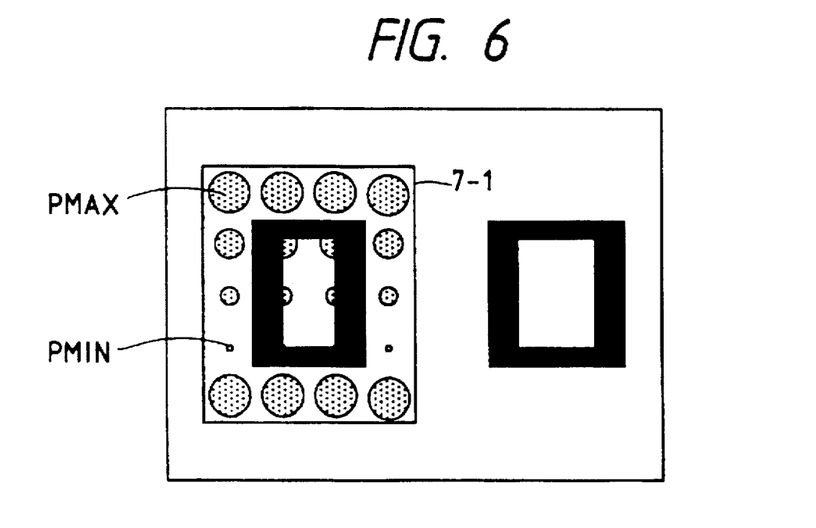
FIG. 6 is a schematic view showing a first gradation output state of the image processing apparatus of the present invention.

FIG. 6 shows a first gradation output state in the image processing apparatus of the present invention, wherein PMIN indicates the smallest pattern in the gradation pattern.

FIG. 6 shows the result of a gradation process only in a designated rectangular area 7-1, on an original containing two rectangles, and the output image can exhibit the expected gradation effect because the position of the largest pattern PAMX in the gradation pattern coincides with the upper edge of the designated area.

[2nd embodiment]

Figure 7:
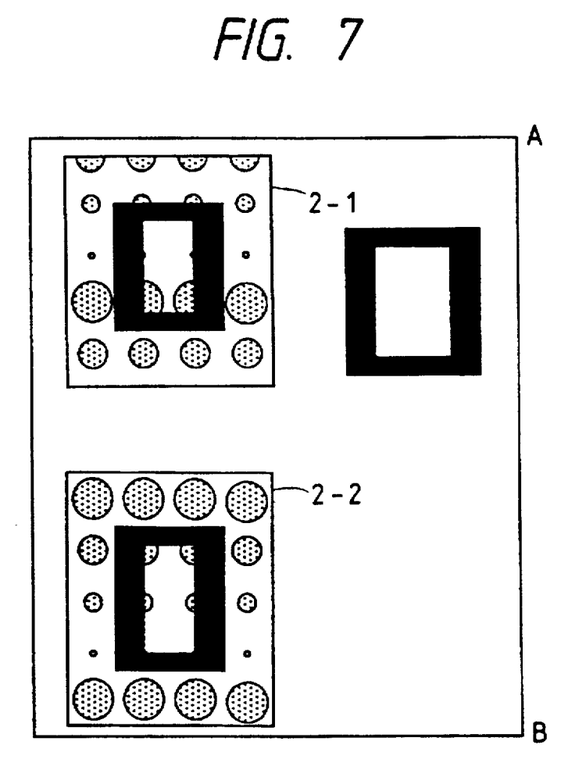
FIG. 7 is a schematic view showing a second gradation output state of the image processing apparatus of the present invention.

FIG. 7 is a schematic view showing a second gradation output state of the image processing apparatus of the present invention.

In the following there will be explained a case, when plural areas 2-1, 2-2 are designated by the operation unit 4-10, of positioning the smallest or largest pattern of the gradation pattern at an end of one of the areas.

In the example shown in FIG. 7, the original contains three rectangles, and two gradation process areas 2-1, 2-2 are designated thereon.

In the first embodiment, the largest pattern of the gradation pattern is generated at the upper end of the area 2-1, and, in the same concept, the largest pattern can be generated at the upper end of the area 2-2.

When the image processing proceeds from A toward B in FIG. 7, the CPU 4700 generates the start signal, prior to the processing of the area 2-1, at such timing that the largest pattern is generated at the upper end of the area 2-2, so that the gradation process is applied also to the area 2-1.

If the start signal is generated at the end of the area 2-2, the gradation is not given to the area 2-1.

[3rd embodiment]

Figure 8:
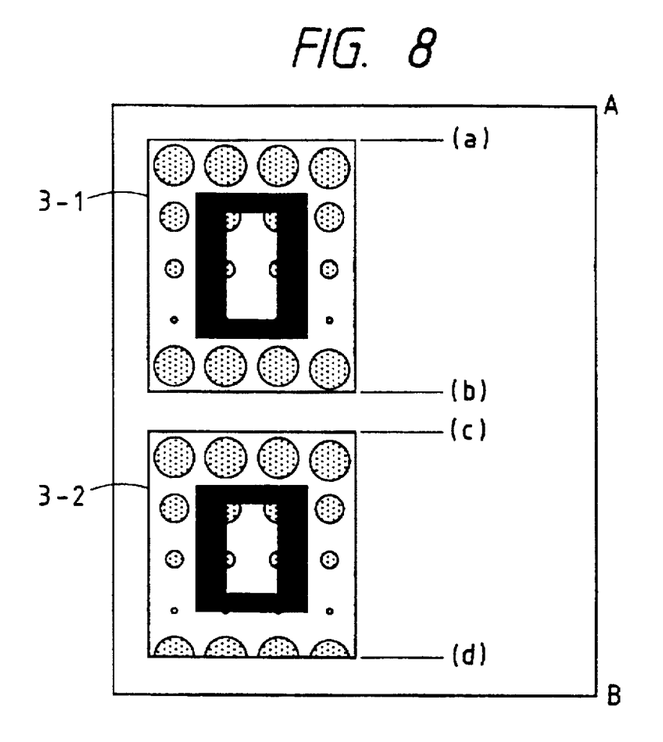
FIG. 8 is a schematic view showing a third gradation output state of the image processing apparatus of the present invention.

FIG. 8 is a schematic view showing a third gradation output state of the image processing apparatus of the present invention.

There will be explained a case, when plural areas are designated, of generating the largest or smallest pattern (largest in this case) of the gradation pattern at the upper end of each designated area.

In the example shown in FIG. 8, the original contains three rectangles and two gradation process areas 3-1, 3-2 are designated by the operation unit 410 on the original.

In FIG. 8, the position of the largest pattern in the gradation pattern coincides with the upper end in each of the areas 3-1, 3-2.

More specifically, in case the image processing proceeds from A toward B, the start signal is activated at a 1st start position (a), then deactivated at a first end position (b), again activated at a 2nd start position (c) and deactivated at a 2nd end position (d), by means of the operation unit 4-10. Consequently the counters 4712, 4711 are started when the image processing proceeds to the position (a), then cleared at the position (b), then again started at the position (c) whereby the gradation process starts again from the largest size, and the generation of the gradation pattern is terminated at the position (d).

The above-mentioned positions (a) - (d) may be selected independently from the area designation, or may be automatically selected from the coordinates of the designated areas in order that the largest or smallest pattern is always positioned at the upper end of each designated area.

The above-explained embodiments can achieve desired image emphasis, by the presence of means for arbitrarily designating the start point of a pattern varying in size.

In the foregoing embodiments, the operation unit 4-10 is used for designating the areas and the position of generation of the largest or smallest pattern, but such designation may be entered from a coordinate input device such as a digitizer, or conducted automatically by recognizing a marked area, marked for example with a marking pen on the original to be read. Also in an image processing apparatus capable of multiple or two-side image processing, the color of the pattern applied to such area may be automatically switched.

The present invention is not limited to the foregoing embodiments but is subject to various modifications within the scope and spirit of the appended claims.

What is claimed is:

1. An image processing apparatus comprising:
   area designation means for designating a desired area on an original;
   mode setting means for setting a mode for superimposing, in the designated area of the original, a gradation image having a pattern size which varies periodically;
   pattern generation means for generating a dot pattern representing said gradation image; and
   control means for controlling said pattern generation means so as to superimpose said gradation image in the area designated by said area designation means when the mode is set,
   wherein said control means controls said pattern generation means so as to position a maximum size pattern or a minimum size pattern of said gradation image at an edge of the designated area in spite of a position of the area designated by said area designation means when the mode is set.

2. An apparatus according to claim 1, wherein said control means is adapted to control said pattern generation means in such a manner that said gradation image is superimposed in a non-image area of said original.

3. An apparatus according to claim 1, further comprising:
   reading means for reading the image of the original; and
   superimposing means for superimposing the image of the original read by said reading means and the gradation image generated from said pattern generation means.

4. An apparatus according to claim 1, wherein said control means is adapted to control said pattern generation means, when an area is not designated by said area designation means, in such a manner that the maximum size pattern or the minimum size pattern is positioned at a position corresponding to an edge of the original.

5. An image processing apparatus, comprising:
   generation means for generating a dot pattern representing a gradation image having periodical gradation;
   position designation means for designating a start position from which said gradation image generated by said generation means is superimposed on a desired image; and
   control means for controlling said generation means so as to superimpose said gradation image from the start position of the desired image designated by said position designation means,
   wherein said control means controls said generation means so that a start point of one cycle of a gradation of the gradation image generated by said generation means corresponds to the start position designated by said position designation means.

6. An apparatus according to claim 5, wherein said position designation means is adapted to designate an end position of a range in which the gradation image is added.

7. An apparatus according to claim 5, wherein said designation means is capable of designating plural desired positions, and said control means is adapted to control said generation means in such a manner that the dot pattern at the starting point of one cycle of said gradation is positioned at each of the designated plural positions.

8. An apparatus according to claim 5, wherein said control means is adapted to control said generation means, when a desired position is not designated by said position designation means, in such a manner that the dot pattern at the starting point of a period of the gradation is positioned at a position of an edge of the desired image.

9. An apparatus according to claim 5, wherein said generation means is adapted to generate a gradation image consisting of patterns whose size varies periodically.

10. An apparatus according to claim 9, wherein the dot pattern at the starting point of said one cycle is a maximum size pattern or a minimum size pattern in the gradation image.

11. An image processing apparatus comprising:
    pattern generation means for generating a dot pattern representing a gradation image having periodical gradation;
    designation means for designating a plurality of areas in which the gradation image generated by said pattern generation means is superimposed, on an original; and
    control means for controlling said pattern generation means so as to superimpose said gradation image in each of the plurality of areas designated by said designation means,
    wherein said control means controls said pattern generation means so that a start point of a cycle of a gradation of said gradation image corresponds to an edge of each of the plurality of areas designated by said designation means or an edge of one of the plurality of areas.

12. An apparatus according to claim 11, wherein said control means is adapted to control said pattern generation means in such a manner that said gradation image is superimposed in a non-image area of said original.

13. An apparatus according to claim 11, further comprising:

reading means for reading the image of the original; and superimposing means for superimposing the image of the original read by said reading means and the gradation image generated from said pattern generation means.

14. An image processing method comprising the steps of:
   a) setting a mode for superimposing, in a designated area of an original, a gradation image having pattern size which varies periodically;
   b) designating a desired area on the original;
   c) inputting an image of the original;
   d) generating the gradation image so as to position a maximum size pattern or a minimum size pattern of the gradation image at an edge of the designated area regardless of a position of the area designated in said step b); and
   e) superimposing the image of the original input in said step c) and the gradation image generated in said step d).

15. A method according to claim 14, wherein a priority is given to the image of the original as to an area of overlap between the image of the original and the gradation image, in said step e).

16. An image processing method comprising the steps of:
   a) designating a start position from which a gradation image having a periodical gradation is superimposed on an original;
   b) inputting an image of the original;
   c) generating the gradation image so that a start point of one cycle of a gradation of the gradation image corresponds to the start position designated in said step a); and
   d) superimposing the image of the original input in said step b) and the gradation image generated in said step c).

17. A method according to claim 16, wherein a priority is given to the image of the original as to an area of overlap between the image of the original and the gradation image, in said step d).

18. A method according to claim 16, wherein said step a) includes designating an area in which the gradation image is superimposed.

19. An image processing apparatus comprising:
   area designation means for designating a desired area on an original;
   mode setting means for setting a mode for superimposing, in the designated area of the original, a gradation image having a pattern size which varies periodically;
   pattern generation means for generating a dot pattern representing the gradation image; and
   control means for controlling said pattern generation means so as to superimpose said gradation image in the area designated by said area designation means when the mode is set by said mode setting means,
   wherein said control means controls said pattern generation means so as to position a maximum size pattern or a minimum size pattern of said gradation image on a predetermined position of the designated area regardless of a position of the area designated by said area designation means when the mode is set.

20. An apparatus according to clam 19, wherein said predetermined position is an edge of the designated area.

21. An apparatus according to claim 19, further comprising:
   reading means for reading the image of the original; and
   superimposing means for superimposing the image of the original read by said reading means and the gradation image generated from said pattern generation means.

22. An apparatus according to claim 21, wherein a priority is given to the image of the original as to an area of overlap between the image of the original and the gradation image.

23. An image processing method comprising the steps of:
   a) designating a desired area on an original;
   b) setting a mode for superimposing, in the designated area of the original, a gradation image having a pattern size which varies periodically;
   c) inputting an image of the original;
   d) generating the gradation image so as to position a maximum size pattern or a minimum size pattern of the gradation image on a predetermined position of the designated area regardless of a position of the area designated in said step a); and
   e) superimposing the image of the original input in said step c) and the gradation image generated in said step d).

24. A method according to claim 23, wherein a priority is given to the image of the original as to an area of overlap between the image of the original and the gradation image in said step e).

25. A method according to claim 23, wherein the predetermined position is an edge of the designated area.

* * * * *

UNITED STATES PATENT AND TRADEMARK OFFICE
CERTIFICATE OF CORRECTION

PATENT NO. : 5,757,980
DATED : May 26, 1998
INVENTOR(S) : TAKASHI SUGIURA

It is certified that error appears in the above-identified patent and that said Letters Patent is hereby corrected as shown below:

COLUMN 1

Line 24, "i.e." should read --i.e.,--.

COLUMN 5

Line 5, "unit 410" should read --unit 4-10--.

COLUMN 8

Line 14, "clam 19," should read --claim 19,--.

Signed and Sealed this

Twentieth Day of April, 1999

Attest:

Q. TODD DICKINSON

Attesting Officer     Acting Commissioner of Patents and Trademarks